United States Patent
Wolf et al.

(10) Patent No.: US 9,908,776 B2
(45) Date of Patent: Mar. 6, 2018

(54) METHOD FOR PRE-REFORMING HYDROCARBONS

(71) Applicant: L'Air Liquide, Societe Anonyme pour l'Etude et l'Exploitation des Procedes Georges Claude, Paris (FR)

(72) Inventors: Ulrich Wolf, Egelsbach (DE); Philipp Marius Hackel, Usingen (DE); Mirko Hubel, Frankfurt am Main (DE)

(73) Assignee: L'AIR LIQUIDE SOCIETE ANONYME POUR L'ETUDE ET L'EXPLOITATION DES PROCEDES GEORGES CLAUDE, Paris (FR)

( * ) Notice: Subject to any disclaimer, the term of this patent is extended or adjusted under 35 U.S.C. 154(b) by 64 days.

(21) Appl. No.: 14/786,012

(22) PCT Filed: Apr. 15, 2014

(86) PCT No.: PCT/EP2014/057626
§ 371 (c)(1),
(2) Date: Oct. 21, 2015

(87) PCT Pub. No.: WO2014/173731
PCT Pub. Date: Oct. 30, 2014

(65) Prior Publication Data
US 2016/0068391 A1    Mar. 10, 2016

(30) Foreign Application Priority Data
Apr. 25, 2013  (DE) .................. 10 2013 104 201

(51) Int. Cl.
*C01B 3/38* (2006.01)
*B01J 8/04* (2006.01)
*B01J 8/06* (2006.01)

(52) U.S. Cl.
CPC ................. *C01B 3/38* (2013.01); *B01J 8/04* (2013.01); *B01J 8/062* (2013.01); *C01B 3/382* (2013.01); *B01J 2208/00106* (2013.01); *B01J 2208/00309* (2013.01); *B01J 2208/00407* (2013.01); *B01J 2208/00884* (2013.01); *B01J 2208/027* (2013.01); *B01J 2208/065* (2013.01); *C01B 2203/0233* (2013.01); *C01B 2203/0816* (2013.01); *C01B 2203/1058* (2013.01); *C01B 2203/1235* (2013.01); *C01B 2203/1241* (2013.01); *C01B 2203/1264* (2013.01); *C01B 2203/143* (2013.01); *Y02P 20/52* (2015.11)

(58) Field of Classification Search
CPC ... C01B 3/38; C01B 3/382; C01B 2203/1235; C01B 2203/1058; B01J 8/062; B01J 8/04; B01J 2208/065; B01J 2208/00106; B01J 2208/027; B01J 2208/00884; B01J 2208/00407; B01J 2208/00309; Y02P 20/52

See application file for complete search history.

(56) References Cited

U.S. PATENT DOCUMENTS

| | | | |
|---|---|---|---|
| 3,743,488 A | 7/1973 | Bogart | |
| 6,103,143 A * | 8/2000 | Sircar | ...................... B01J 8/008 252/373 |
| 2002/0165417 A1 * | 11/2002 | Numaguchi | ........... B01J 8/0488 585/310 |
| 2010/0264373 A1 * | 10/2010 | Licht | ...................... C01B 3/382 252/373 |
| 2012/0157731 A1 | 6/2012 | Grover | |

FOREIGN PATENT DOCUMENTS

| EP | 0 921 585 | 6/1999 |
|---|---|---|
| EP | 1 241 130 | 9/2002 |
| WO | WO 2010/120962 | 10/2010 |

OTHER PUBLICATIONS

International Search Report for PCT/EP2014/057626, dated Jul. 21, 2014.

* cited by examiner

*Primary Examiner* — Brian McCaig
*Assistant Examiner* — Jason Chong
(74) *Attorney, Agent, or Firm* — Justin K. Murray

(57) ABSTRACT

There is proposed a method for pre-reforming a hydrocarbonaceous feed stream into a pre-reforming product containing carbon oxides, hydrogen and hydrocarbons, in which the adiabatically operated pre-reforming reactor comprises at least two reaction zones designed as fixed beds in a common reactor vessel, which are in fluid connection with each other and are filled with beds of granular, nickel-containing catalyst active for pre-reforming, wherein the first reaction zone in flow direction is filled with a catalyst active for high-temperature pre-reforming and the last reaction zone in flow direction is filled with a catalyst active for low-temperature pre-reforming.

8 Claims, No Drawings

METHOD FOR PRE-REFORMING HYDROCARBONS

CROSS REFERENCE TO RELATED APPLICATIONS

This application is a § 371 of International PCT Application PCT/EP2014/057626, filed Apr. 15, 2014, which claims the benefit of DE 10 2013 104 201.5, filed Apr. 25, 2013, both of which are herein incorporated by reference in their entireties.

FIELD OF THE INVENTION

This invention relates to a method for pre-reforming a hydrocarbonaceous feed stream, in particular natural gas, into a pre-reforming product containing carbon oxides, hydrogen and hydrocarbons, wherein the hydrocarbonaceous feed stream is introduced into a multistage, adiabatically operated pre-reforming reactor designed as shaft reactor by adding reforming steam, and in said pre-reforming reactor is converted to a pre-reforming product under pre-reforming conditions. As compared to the pre-reforming methods known from the prior art, the method according to the invention improves the conversion of the hydrocarbonaceous feed stream and thus increases the efficiency of an integrated reforming method, comprising the pre-reforming method according to the invention as well as a main reforming stage, which is operated by the steam cracking method (steam reforming) known per se.

The invention furthermore relates to a multistage pre-reforming reactor for carrying out the method according to the invention, a pre-reforming plant comprising the same, and an integrated reforming plant comprising such pre-reforming plant and a main reforming reactor.

BACKGROUND

Hydrocarbons can catalytically be converted with steam to obtain synthesis gas, i.e. mixtures of hydrogen ($H_2$) and carbon monoxide (CO). As is explained in Ullmann's Encyclopedia of Industrial Chemistry, Sixth Edition, 1998 Electronic Release and 6th edition 2003, keyword "Gas Production", this so-called steam reforming (steam reforming) is the most frequently used method for the production of synthesis gas, which subsequently can be converted to further important basic chemicals such as methanol or ammonia. Although it is possible to convert different hydrocarbons, such as for example naphtha, liquefied gas or refinery gases, the steam reforming of methane-containing natural gas is dominant.

The steam reforming of natural gas proceeds strongly endothermally. It is therefore carried out in a reformer furnace in which numerous catalyst-containing reformer tubes are arranged in parallel, in which the steam reforming reaction takes place. The outer walls of the reformer furnace as well as its ceiling and its bottom are lined or covered with several layers of refractory material which withstands temperatures up to 1200° C. The reformer tubes mostly are fired by means of burners, which are mounted on the upper side or bottom side or at the side walls of the reformer furnace and directly fire the space between the reformer tubes. The heat transfer to the reformer tubes is effected by thermal radiation and convective heat transfer from the hot flue gases.

After preheating by heat exchangers or fired heaters to about 500° C., the hydrocarbon-steam mixture enters into the reformer tubes after final heating to about 500 to 800° C. and is converted there at the reforming catalyst to obtain carbon monoxide and hydrogen. Nickel-based reforming catalysts are widely used. Whereas higher hydrocarbons are completely converted to carbon monoxide and hydrogen, a partial conversion usually is effected in the case of methane. The composition of the product gas is determined by the reaction equilibrium; beside carbon monoxide and hydrogen, the product gas therefore also contains carbon dioxide, non-converted methane and steam.

For energy optimization and/or for feedstocks with higher hydrocarbons, a so-called prereformer can be used after the preheater for pre-cracking the feedstock. In a further heater, the pre-cracked feedstock then is heated to the desired inlet temperature into the main reformer, for example the steam reformer.

Pre-reforming mostly is understood to be the application of an adiabatic low-temperature reforming step, which is arranged upstream of a conventional steam reformer operated with natural gas. The conventional pre-reforming can be defined as steam reforming process at limited temperatures (distinctly below 700° C.). It leads to a gaseous intermediate product whose main constituents are methane and steam. The intermediate product contains no or only small amounts of higher hydrocarbons. This intermediate product normally is treated further in a steam reformer referred to as main reformer.

In contrast to the steam reforming reaction, the reaction equilibrium is set at far lower temperatures during pre-reforming. The main feature of the pre-reforming is the irreversible, complete conversion of the higher hydrocarbons in the feed mixture to obtain methane and in part synthesis gas constituents. Due to the distinctly lower temperature as compared to the steam reforming, the main product of the pre-reforming is methane beside non-converted steam. The remaining gas components are hydrogen, carbon dioxide, traces of carbon monoxide and inert components which have already been present in the feedstock. In dependence on the feedstock, pre-reforming can proceed endothermally or exothermally. In general, the steam conversion of the hydrocarbons to carbon monoxide and hydrogen is endothermal. But since pre-reforming is carried out at moderate temperatures only, the produced carbon oxides partly are converted further to obtain methane, a reaction with considerable exothermicity. For this reason, pre-reforming of naphtha is an exothermal process, whereas pre-reforming of natural gas leads to a generally endothermal course of the pre-reforming reaction.

Since pre-reforming is a steam reforming process at low temperatures, special catalysts are required, in order to provide for sufficiently high reaction rates. In general, this is achieved by means of catalysts which have a high nickel content, for example 30 to 70 wt-%.

Of the various possibilities of using the pre-reforming process, pre-reforming of natural gas presently is utilized most frequently. The driving force for the application of this technology is the general endeavor to attain a method with improved economy. The prereformer is mounted upstream of a main reformer including a plurality of catalyst-filled tubes, in order to simplify the operation of the main reformer. Since virtually all higher hydrocarbons which are present in the natural gas used as feed are converted to methane and synthesis gas constituents, the risk of the formation of coke deposits in the main reformer, which with respect to the operation of the main reformer represents a particularly critical point, is reduced considerably. This permits the decrease of the steam/carbon ratio (S/C) and the increase of the heat load of the reformer tubes, which leads to a generally lower energy consumption and to a reduction in size of the used apparatuses. In addition, an amount of hydrogen already is produced in the prereformer by conversion of natural gas, and traces of catalyst poisons left in the feed mixture are adsorbed or absorbed on the pre-reforming catalyst. This leads to the fact that the reforming catalyst present in the main reformer operates under optimum conditions in particular at its inlet.

Pre-reforming generally is operated in adiabatic shaft reactors, which have a typical inlet temperature in the vicinity of 500° C. Due to the endothermal conversion of the hydrocarbons, the temperature at the outlet of the pre-reforming reactor typically is lower by 25 to 40° C., in dependence on the amount of the higher hydrocarbons in the natural gas. The gas product leaving the pre-reforming stage, mostly is heated up further before being introduced into the main reformer. Since the steam reforming technology generally has an excess of energy, which otherwise can only be used for the production of process steam or export steam, this is an additional possibility for improving the total energy balance of the integrated reforming plant. In the conventional steam reforming process, the reintegration of the available process heat either by recirculation of the flue gases of the reformer furnace or by recovery from the product gases is limited by the risk of cracking, which occurs when natural gas/steam mixtures are heated up to temperatures above about 550° C. This risk rises considerably with increasing content of higher hydrocarbons. Due to the absence of all higher hydrocarbons with the exception of methane and the higher hydrocarbon content, prereformed natural gas can be heated up to temperatures of about 650° C. without significant cracking.

From the prior art, further developments of the above-discussed basic concept of the use of the pre-reforming also are known, which aim at operating the pre-reforming in higher temperature ranges.

The European Patent Application EP 1241130 A1 for example discloses a method for producing a synthesis gas, in which a desulfurized light natural gas is mixed with steam and preheated, a first reforming reaction is carried out at a temperature of 500 to 750° C. under adiabatic conditions, in that the gas mixture is brought in contact with a catalyst with defined porosity, which in addition has a specific content of nickel or a metal of the platinum group as active component on a carrier, consisting of $CaO/Al_2O_3$ mixtures or $\alpha\text{-}Al_2O_3$. The catalyst has a nickel content of 3 to 20 wt-% or a content of the metal of the platinum group of 0.2 to 5 wt-%. Subsequently, a further reforming (main reforming) is carried out in a reformer furnace comprising reformer tubes. The light natural gas can be obtained from a heavy natural gas containing higher hydrocarbons by conversion in a reactor which contains a catalyst active for the methanation of carbon oxides, i.e. by a further pre-reforming stage upstream of the pre-reforming taught here, which is operated at inlet temperatures of 350 to 450° C. Therefore, a total of two pre-reforming stages and one main reforming stage is obtained.

The International Patent Application WO 2010/120962 A1 describes a further, likewise two-stage pre-reforming method, in which the feed mixture containing steam and hydrocarbons of a first adiabatic reaction stage operated at temperatures of 425 to 600° C. is converted on a first reforming catalyst, which has a content of 30 to 50 wt-% of a metal from a group comprising nickel and cobalt on a carrier. In the second pre-reforming stage downstream of the first pre-reforming stage, the further conversion is effected after heating to temperatures between 425 and 730° C. on a first reforming catalyst, which has a content of 10 to 20 wt-% of a metal from a group comprising nickel and cobalt on a carrier. The second pre-reforming stage likewise can be operated adiabatically, but can also be heated. The product of the two-stage pre-reforming is supplied to a downstream main reforming stage comprising a plurality of catalyst-filled reformer tubes, which is arranged in a reformer furnace.

What is disadvantageous in the method for pre-reforming at high temperatures, i.e. above 600 to 650° C., which is described in the prior art, is the limitation of the conversion on catalysts optimized for the use at such high temperatures due to the adiabatic reaction control. These catalysts have a high stability and sufficient conversions at high temperatures, which is achieved by limiting the nickel content to contents of typically below 30 wt-%. In the adiabatic conversion, however, the gas temperature decreases in flow direction, due to the endothermal conversion of the methane to carbon oxides and hydrogen, so that the optimum temperature range for the high-temperature pre-reforming catalyst is left in downward direction. The consequence is that in the portion of the pre-reforming reactor close to the outlet only insufficient hydrocarbon conversions are achieved, whereby the space-time yield based on the reactor volume is limited. On the other hand, adiabatic reactors as compared to heated reactors have the advantage of the constructive simplicity, which leads to lower apparatus costs and a greater ruggedness of the reactors used.

SUMMARY OF THE INVENTION

An object of the present invention therefore can include a pre-reforming method which uses a constructively simple reaction apparatus, whose space-time yield based on the reactor volume is increased, however, as compared to the methods or reactors known from the prior art.

The aforementioned object is solved with the invention according to any of the claims described herein, substantially with a method for pre-reforming a hydrocarbonaceous feed stream into a pre-reforming product containing carbon oxides, hydrogen and hydrocarbons, wherein the hydrocarbonaceous feed stream is introduced into a multistage, adiabatically operated pre-reforming reactor designed as shaft reactor by adding reforming steam and is converted there under pre-reforming conditions to obtain a pre-reforming product, wherein the pre-reforming reactor comprises at least two reaction zones designed as fixed beds in a common reactor vessel, which are in fluid connection with each other and are filled with beds of granular, nickel-containing catalyst active for pre-reforming, wherein the first reaction zone in flow direction is filled with a catalyst active for high-temperature pre-reforming and the last reaction zone in flow direction is filled with a catalyst active for low-temperature pre-reforming.

Fluid connection between two regions of the reformer tube is understood to be any kind of connection which enables a fluid, for example the feed gas stream or the synthesis gas product stream, to flow from the one to the other of the two regions, regardless of any interposed regions or components.

Adiabatic reactor operation is understood to be a reactor operation which is characterized in that except for the convective heat stream introduced with the feed stream no foreign energy is supplied to the reactor and in addition a heat exchange of the reactor with the surroundings is reduced or even completely inhibited by constructive measures, for example by mounting thermal insulations.

Pre-reforming conditions are understood to be reaction conditions which effect at least a partial conversion of the substances contained in the feed stream to obtain carbon oxides, hydrogen and hydrocarbons. In particular, the amount of higher hydrocarbons, i.e., all hydrocarbons with the exception of methane, is to be reduced. The conversion conditions required for pre-reforming, in particular suitable reaction temperatures, are known in principle to the skilled person from the prior art, for example from the documents discussed above. Necessary adaptations of these conditions to the respective operating requirements, for example to the composition of the feed stream or to the type of catalysts used, will be made on the basis of routine experiments.

Catalysts which are active for the high-temperature pre-reforming or the low-temperature pre-reforming are understood to be catalysts which during the pre-reforming of hydrocarbonaceous feed streams at temperatures above or below 600 to 650° C. show economically acceptable conversions, wherein the exact size of this conversion also depends on other method parameters, for example the space velocity of the feed stream and its exact composition, as well as on economic marginal conditions such as the raw material costs.

Further advantageous aspects of the reformer tube according to the invention can be found in the dependent claims.

The invention also relates to a multistage pre-reforming reactor, comprising a common reactor vessel, means for the thermal insulation of the reactor vessel against the surroundings, an inlet port and an outlet port, at least two catalyst supporting trays, for example sieve plates or perforated plates, for accommodating beds of granular pre-reforming catalyst which is characterized in that the catalyst supporting tray adjacent to the inlet port is covered with a bed of granular pre-reforming catalyst which has a nickel content of less than 30 wt-% and the catalyst supporting tray adjacent to the outlet port is covered with a bed of a pre-reforming catalyst which has a nickel content of more than 30 wt-%.

Furthermore, an embodiment of the invention may also relate to a pre-reforming plant comprising an inventive multistage pre-reforming reactor, a heating device, connecting lines and a single-stage fixed-bed reactor designed as shaft reactor upstream of the multistage pre-reforming reactor, wherein said fixed-bed reactor includes means for the thermal insulation of the reactor vessel against the surroundings and contains a bed of granular pre-reforming catalyst with a nickel content of more than 30 wt-%.

Finally, an embodiment of the invention may also relate to an integrated reforming plant, comprising a pre-reforming plant, a further heating device, connecting lines and a main reforming reactor, wherein the latter contains a plurality of catalyst-containing reformer tubes and a reformer furnace with burners for firing the reformer tubes.

An embodiment of the invention can be based on the finding that it is advantageous to design a multistage, adiabatically operated pre-reforming reactor for carrying out the high-temperature pre-reforming with a plurality of reaction zones which are filled with different pre-reforming catalysts. For the catalyst arranged in the vicinity of the reactor inlet, i.e. which is located in the first reaction zone in flow direction, there should favorably be selected a pre-reforming catalyst which is optimized for the high-temperature pre-reforming. Such catalysts, which are offered by the trade, are characterized by sufficient activities and a high stability at high temperatures. A high intrinsic activity of the catalyst is not required due to the high reaction rates already at high temperatures.

Due to the endothermal conversion of a part of the hydrocarbonaceous feed stream in the first reaction zone in conjunction with the adiabatic design of the pre-reforming reactor, the gas temperature at the outlet from the first reaction zone is lower than at the inlet into the first reaction zone. It therefore is advantageous to supply the partly converted feed stream to at least one further reaction zone, which is filled with a catalyst which is optimized for the pre-reforming at lower temperatures. Such catalysts, which likewise are commercially available, have a higher low-temperature activity for the pre-reforming, but a lower temperature resistance to high reaction temperatures. Their properties therefore are optimally exploited in the region of the multistage pre-reforming reactor close to the outlet. As compared to an operation of the pre-reforming reactor exclusively with high-temperature pre-reforming catalyst, the total conversion and the space-time yield based on the reactor volume is higher. An operation of the pre-reforming catalyst exclusively with high-temperature pre-reforming catalyst would not lead to technically acceptable stabilities due to an excessive catalyst deactivation in the first reaction zone located close to the inlet, which is operated at high temperatures.

DETAILED DESCRIPTION OF THE INVENTION

Preferably, the hydrocarbonaceous feed stream comprises methane and higher hydrocarbons, wherein the amount of higher hydrocarbons is reduced during the pre-reforming and the methane content is increased. As discussed already, the pre-reforming of methane-containing feed gases, such as natural gas, generally proceeds endothermally, so that the above-mentioned advantages of the method according to the invention will fully be noticeable.

It furthermore is preferred that the hydrocarbonaceous feed stream includes natural gas with a content of higher hydrocarbons of at least 1 vol-%, preferably at least 5 vol-%, is used. Such natural gases can be processed particularly advantageously with the method according to the invention.

It is preferred particularly when the inlet temperature of the hydrocarbonaceous feed stream into the pre-reforming reactor lies in the temperature range from 650 to 800° C. and the outlet temperature of the pre-reforming product from the pre-reforming reactor lies in the temperature range from 500 to 650° C., preferably in the temperature range from 520 to 600° C. In these temperature ranges, favorable catalyst activities and acceptable stabilities are observed for the different types of pre-reforming catalyst.

It was found to be particularly favorable that the catalyst optimized for the high-temperature pre-reforming has a nickel content of less than 30 wt-% and the catalyst optimized for the low-temperature pre-reforming has a nickel content of more than 30 wt-%. During the high-temperature pre-reforming, the stability of nickel-based pre-reforming catalysts generally increases with rising nickel content. On the other hand, at lower reaction temperatures pre-reforming catalysts with higher intrinsic activity are required. It was found that said nickel content of about 30 wt-% is to be understood as guide value for distinguishing between these types of pre-reforming catalysts.

An advantageous aspect of the method according to the invention provides that upstream of the multistage pre-reforming reactor at least one further single-stage, adiabatically operated fixed-bed reactor designed as shaft reactor is provided, which is charged with the hydrocarbonaceous feed stream and in which a pre-reforming of the hydrocarbonaceous feed stream is effected on a nickel-containing catalyst optimized for low-temperature pre-reforming under low-temperature pre-reforming conditions, wherein the product stream obtained is discharged from the single-stage fixed-bed reactor, heated up and charged to the multistage pre-reforming reactor. In particular in the case of natural gases with a content of higher hydrocarbons of more than 5 vol-%, this design is advantageous, as in particular the higher hydrocarbons are converted in an upstream pre-reforming stage, so that at the inlet of the multistage pre-reforming reactor according to the invention, at which particularly high temperatures exist, carbon deposition due to excessive cracking is avoided. In a further aspect, the invention relates to an integrated reforming method, wherein downstream of the multistage pre-reforming reactor a main reforming reactor is provided, which comprises a plurality of catalyst-containing reformer tubes and a reformer furnace with burners for firing the reformer tubes, wherein the main reforming reactor is charged with the heated pre-reforming product and wherein in the main reforming reactor the conversion of the pre-reforming product is effected under steam reforming conditions to obtain a synthesis gas product containing carbon oxides and hydrogen, which is discharged from the main reforming reactor and subjected to an after-treatment. Upstream of the multistage pre-reforming reactor, at least one further single-stage, adiabatically operated fixed-bed reactor in turn can be provided, in particular during the processing of natural gases with a content of higher hydrocarbons of more than 5 vol-%.

Exemplary Embodiments and Numerical Examples

Further developments, advantages and possible applications of the invention can also be taken from the following description of exemplary embodiments and numerical examples. All features described form the invention per se or in any combination, independent of their inclusion in the claims or their back-reference.

In an exemplary embodiment according to a particularly preferred embodiment of the invention, a further single-stage fixed-bed reactor designed as shaft reactor was provided upstream of the pre-reforming reactor comprising two reaction zones, whose reaction zones were filled with two different pre-reforming catalysts. Both the two-stage pre-reforming reactor and the upstream single-stage fixed-bed reactor were operated adiabatically.

Catalyst fillings. The upstream single-stage fixed-bed reactor was filled with a commercial low-temperature pre-reforming catalyst, whose nickel content roughly was 50 wt-%. The reaction zone of the downstream two-stage pre-reforming catalyst close to the inlet was filled with a commercial steam reforming catalyst, which also was active for the high-temperature pre-reforming and whose nickel content roughly was 15 wt-%. The reaction zone of the downstream two-stage pre-reforming catalyst close to the outlet, on the other hand, was filled with a commercial pre-reforming catalyst whose nickel content was more than 55 wt-%.

The single-stage fixed-bed reactor was charged with a hydrocarbonaceous feed stream which consisted of 91 vol-% of methane, 5 vol-% of ethane, 2 vol-% of butane and 2 vol-% of hydrogen. To this feed stream so much reforming steam was admixed that the steam/carbon ratio S/C was =2.0 mol/mol. At the inlet into the single-stage fixed-bed reactor the pressure was 35 bar, absolute, and the temperature was 480° C.

After exit from the single-stage fixed-bed reactor, the partly converted feed stream was heated to a temperature of 650° C. by means of an electric gas heater and charged to the two-stage pre-reforming reactor. Again, so much reforming steam was admixed to the feed stream that the steam/carbon ratio S/C was =2.0 mol/mol. The gas composition was 80 vol-% of methane, 15 vol-% of hydrogen and 5 vol-% of carbon dioxide. In the first reaction zone of the two-stage pre-reforming reactor, the further endothermal conversion of the feed stream was effected, wherein the temperature on exit from the first reaction zone was about 550° C. With this temperature, the feed stream entered into the second reaction zone of the two-stage pre-reforming reactor, in which a further conversion of the methane to hydrogen and carbon oxides was effected.

INDUSTRIAL APPLICABILITY

With the invention, there is proposed a method for pre-reforming a hydrocarbonaceous feed stream, in particular natural gas, which as compared to the pre-reforming methods known from the prior art improves the conversion of the hydrocarbons and thus increases the total energetic efficiency of an integrated reforming method, which comprises the prereformer operated by the method according to the invention as well as a steam reformer as main reforming stage. Due to the increased energy efficiency as compared to a conventional, integrated reforming method known already, the formation of excess process steam, whose release as export steam not always is desired, can largely be avoided.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for pre-reforming a hydrocarbonaceous feed stream into a pre-reforming product containing carbon oxides, hydrogen, and hydrocarbons, the method comprising the step of introducing the hydrocarbonaceous feed stream into a multistage, adiabatically operated pre-reforming reactor under pre-reforming conditions to obtain a pre-reforming product, wherein the multistage pre-reforming reactor is a shaft reactor, wherein the multistage pre-reforming reactor comprises at least two reaction zones designed as fixed beds in a common reactor vessel, which are in fluid connection with each other and are filled with beds of granular, nickel-containing catalyst active for the pre-reforming, and wherein a first reaction zone in flow direction is filled with a first reaction zone catalyst having a nickel content of less than 30 wt-% and a last reaction zone in flow direction is filled with a last reaction zone catalyst having a nickel content of more than 30 wt-%.

2. The method according to claim 1, wherein the hydrocarbonaceous feed stream comprises methane and $C_{2+}$ hydrocarbons, wherein the pre-reforming product has a reduced amount of $C_{2+}$ hydrocarbons and an increased amount of methane as compared to the hydrocarbonaceous feed stream.

3. The method according to claim 1, wherein the hydrocarbonaceous feed stream comprises natural gas with a content of $C_{2+}$ hydrocarbons of at least 1 vol-%.

4. The method according to claim 1, wherein the hydrocarbonaceous feed stream comprises natural gas with a content of $C_{2+}$ hydrocarbons of at least 5 vol-%.

5. The method according to claim 1, wherein an inlet temperature of the hydrocarbonaceous feed stream into the multistage pre-reforming reactor ranges from 650 to 800° C. and an outlet temperature of the pre-reforming product from the multistage pre-reforming reactor ranges from 500 to 650° C.

6. The method according to claim 1, wherein upstream of the multistage pre-reforming reactor at least one further single-stage, adiabatically operated fixed-bed reactor designed as shaft reactor is provided, which is charged with the hydrocarbonaceous feed stream and in which a pre-reforming of the hydrocarbonaceous feed stream is effected on a nickel-containing catalyst containing a nickel content of more than 30 wt-%, wherein a product stream obtained from the single-stage fixed-bed reactor is discharged, heated up, and charged to the multistage pre-reforming reactor.

7. The method according to claim 6, wherein the hydrocarbonaceous feed stream comprises natural gas with a content of $C_{2+}$ hydrocarbons of more than 5 vol-%.

8. The method according to claim 1, further comprising the steps of:

providing a main reforming reactor downstream of the multistage pre-reforming reactor, wherein the main reforming reactor comprises a plurality of catalyst-containing reformer tubes and a reformer furnace with burners for firing the reformer tubes;

heating the pre-forming product to form a heated pre-forming product;

introducing the heated pre-reforming product to the main reforming reactor under steam reforming conditions effective for the conversion of the pre-reforming product into obtain a synthesis gas product containing carbon oxides and hydrogen; and discharging the synthesis gas product from the main reforming reactor and subjecting said synthesis gas product to an after treatment.

* * * * *